United States Patent [19]

Welschof

[11] Patent Number: 4,741,785
[45] Date of Patent: May 3, 1988

[54] PROCESS FOR FORMING HARDENED CONTACT SURFACES IN A UNIVERSAL BALL JOINT

[75] Inventor: Hans-Heinrich Welschof, Rodenbach, Fed. Rep. of Germany

[73] Assignee: Löhr & Bromkamp GmbH

[21] Appl. No.: 662,522

[22] Filed: Oct. 18, 1984

Related U.S. Application Data

[63] Continuation of Ser. No. 542,089, Oct. 17, 1983, abandoned, which is a continuation of Ser. No. 406,994, Aug. 10, 1982, abandoned.

[30] Foreign Application Priority Data

Aug. 17, 1981 [DE] Fed. Rep. of Germany ....... 3132363

[51] Int. Cl.$^4$ .............................................. C21D 9/40
[52] U.S. Cl. .................................. 148/154; 148/902; 148/906
[58] Field of Search .................. 148/154, 39, 145, 148, 148/142, 902, 906; 219/10.43, 10.57; 29/148.4 A, 527.2

[56] References Cited

U.S. PATENT DOCUMENTS 2,414,141  1/1947  Denneen et al. ................ 219/10.43
3,982,840  9/1976  Grosseau ...................... 29/148.4 A

FOREIGN PATENT DOCUMENTS 2817167  4/1978  Fed. Rep. of Germany .
0164033  12/1980  Japan .................................. 148/146

OTHER PUBLICATIONS

*Metals Handbook*, vol. 4, 9th ed., pp. 191, 507, 518, 11/81, American Soc. for Metals, Metals Park, Ohio.

Primary Examiner—L. Dewayne Rutledge
Assistant Examiner—S. Kastler
Attorney, Agent, or Firm—Toren, McGeady & Associates

[57] ABSTRACT

In the manufacture of a universal joint which includes an inner and outer joint member, a cage, and torque-transmitting balls supported in the cage and received in ball tracks formed in the outer face of the inner joint member and the inner face of the outer joint member, contact faces along which the balls run in the tracks and in contact with the cage are partially hardened to a relatively great depth taken relative to the wall thickness of the workpiece by means of a shaped inductor. The contact faces between the cage and both the inner and outer joint members, respectively, are also formed with a wear-resistant layer which is thin taken relative to the wall thickness of the workpiece.

7 Claims, 5 Drawing Sheets

PROCESS FOR FORMING HARDENED CONTACT SURFACES IN A UNIVERSAL BALL JOINT

This is a continuation of application Ser. No. 542,089 filed Oct. 17, 1983, which is a continuation of application Ser. No. 406,994 filed Aug. 10, 1982, now both abandoned.

The present invention relates generally to the manufacturing of universal joints and more particularly to joints of the type wherein the outer face of an inner joint member and the inner face of an outer joint member are provided with ball tracks for receiving therein torque-transmitting balls with the balls being guided in a cage member of the joint. The invention relates more specifically to a process for hardening the inner and/or outer joint member as well as the cage of the ball joint.

Processes for hardening joint rings of shaft joints are known in the prior art, for example in German Offenlegungsschrift No. 28 17 167. Although it is common to use symmetrical inductors, a disadvantage is that the smaller the distance between the inductor and the workpiece, the greater will be the depth of hardness. Consequently, if there is a substantial distance between the inductor and the workpiece, the depth of the hardness will be smaller. This is usually exactly the opposite of what is required to be achieved based upon the proper functioning of the joint. During operation of a joint, high Hertzian stresses will occur in the ball track of the joint, but the depth of hardness will be relatively small relative to the cage track.

In the case of ball joints, points of very high loading occur in the tracks between the ball and the ball track as a result of the point contact which occurs. Peak loads of 4,000 $Nm/mm^2$ must be absorbed so that there arises the risk of pitting of the material which might cause failure of the entire joint.

In the contact faces between the cage and the guide faces of the inner or outer joint member, very high frictional loads must be accommodated over the entire area. As a result of the surface loads which occur, the surface pressure is low and the resulting wear only occurs in the form of abrasion.

In joints which are currently manufactured, such disadvantages are eliminated in that both the inner joint member and the outer joint member are produced as solid parts. However, a disadvantage of such designs is that using solid compact materials makes the joint expensive to manufacture and relatively heavy. Additionally, high unsprung masses occur. In the running gear of the vehicle, it is of particular importance that weight be reduced. Furthermore, due to the considerable hardness distortions, grinding becomes necessary.

In the case of the cage member, due to the thin wall thickness of the cage, excessive depth of hardening of the material will lead to a core cross-section which is very small and as a result the overall strength of the cage member will be impaired.

Accordingly, the present invention is directed toward providing a process for hardening thin-walled components or those components which do not receive further treatment after hardening which hardening process will ensure that there is little distortion and which will provide a sufficient depth of hardening permitting different loads occurring in the joint to be absorbed while reducing hardening distortions and preventing thin-walled parts from being hardened to an excessive depth.

SUMMARY OF THE INVENTION

Briefly, the present invention may be described as a process for manufacturing a universal joint which includes an inner and outer joint member, a cage, and torque-transmitting balls supported in the cage and received in ball tracks formed in the outer face of the inner joint member and in the inner face of the outer joint member, the balls running along ball tracks and in contact with the cage along ball contact surfaces formed in the ball tracks and in the cage. The process of the invention particularly comprises the steps of hardening the ball conact surfaces between the balls and the ball tracks and between the balls and the cage by means of a shaped inductor to form the hardened areas to a substantial depth relative to the wall thickness of the workpiece and providing in the cage at each of the contact faces between the cage and the inner and outer joint members, respectively, a wear-resistant layer which is relatively thin as compared with the wall thickness of the workpiece.

Thus, in accordance with the invention, the advantages of the invention are achieved in that by means of a shaped conductor, the contact faces between the balls and the ball tracks and between the balls and the cage, respectively, are partially hardened to a great or substantial depth relative to the wall thickness of the workpiece and the contact faces between the cage and the inner joint member and the outer joint member, respectively, are provided with a wear-resistant layer which is relatively thin as compared with the wall thickness of the workpiece.

An advantage of partial hardening of the workpiece in accordance with the present invention is that the amount of hardening distortion will be kept relatively low. Furthermore, the risk of through-hardening of thin-walled workpieces is prevented so that the risk of breakage or bursting especially of the outer joint member when subjected to high loads during service will be reduced. With the process of the invention, the overall toughness or strength of the cage is improved and there does not arise a need for subsequent treatment by grinding.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
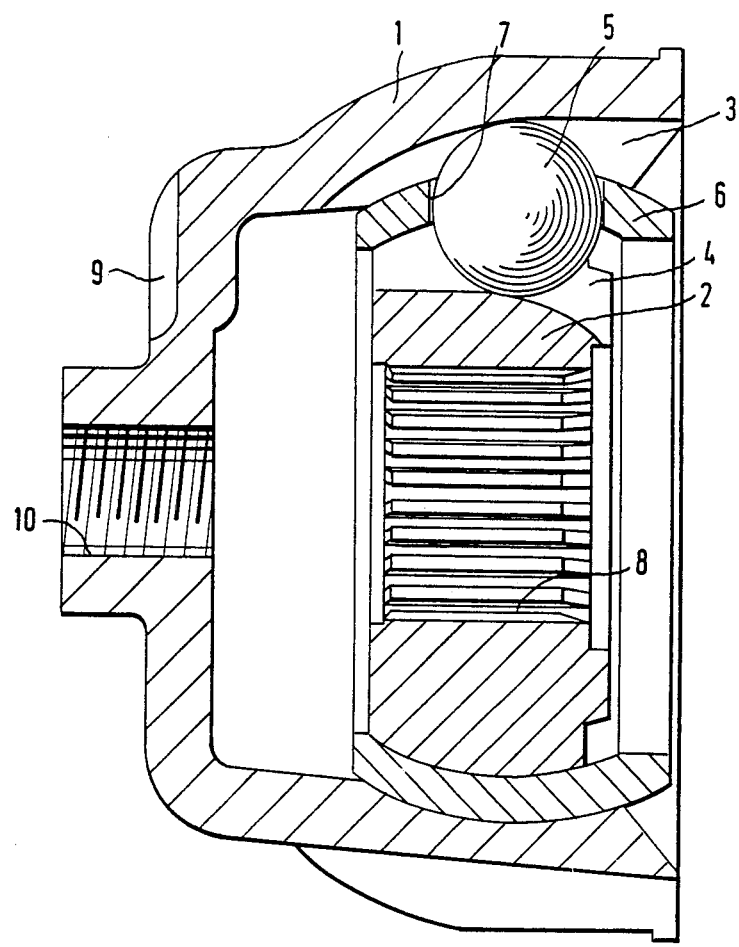
FIG. 1 is a sectional view of a universal joint with a cage.

Referring now to the drawings, there is shown in FIG. 1 a rotary constant velocity universal joint which may be formed in accordance with the invention and which consists essentially of an outer joint member 1 and an inner joint member 2, with both the outer member 1 and the inner member 2 being provided with ball tracks 3 and 4 for receiving torque-transmitting balls 5. A cage member 6 is formed with windows 7 within which the balls 5 are held in guided engagement between the inner and outer joint members 2, 1.

Viewed in longitudinal section, it will be seen that the ball tracks 3 and 4 are free from undercut. The outer joint member 1 is formed in a process that does not involve chip removal or formation from plate metal. The inner member 2 is formed with a central bore 8 which serves to receive therein a drive shaft (now shown) with the outer member 1 being provided with teeth 9 as well as a bore 10 for fixing or mounting purposes. The interior of the joint is sealed by a boot which, for simplification, is not illustrated.

Figure 2:
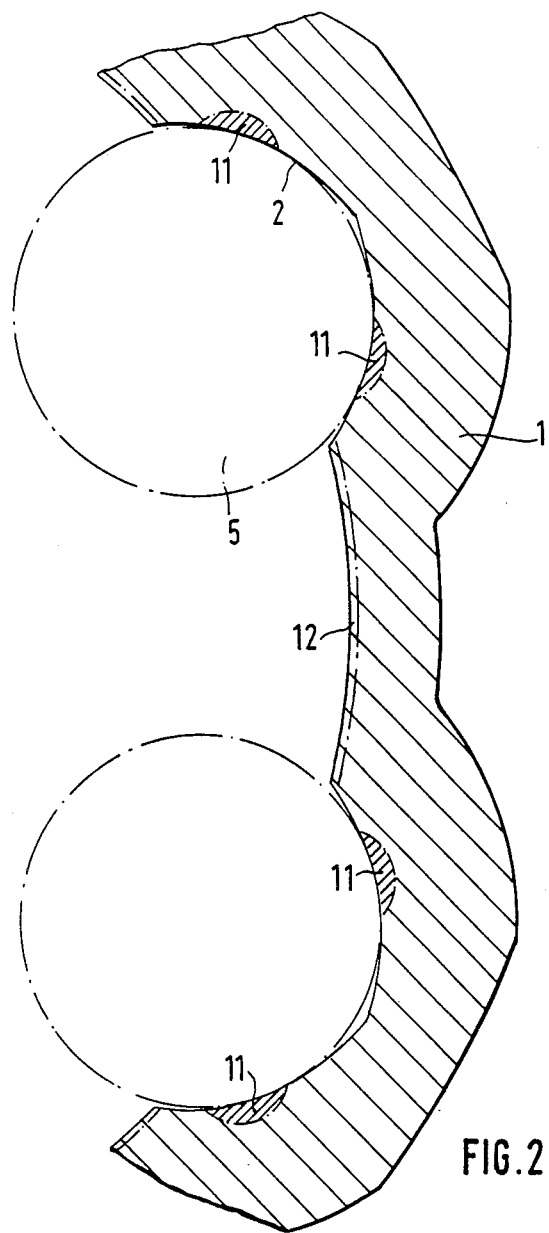
FIG. 2 is a sectional view showing a part of the outer joint member and the ball tracks formed therein.

FIG. 2 is a sectional view showing a part of the outer joint member 1 and the ball tracks 3 therein which serve to accommodate the torque-transmitting balls 5. As will be seen from FIG. 2, the track portions 3 are formed with contact areas 11 which are hardened to a significant depth and on which the balls 5 are supported when in operation in the ball tracks 3. The areas 11 are hardened to a considerable depth since the point contact between the ball and the ball track causes very high surface pressures.

Also shown in FIG. 2 in chain-dotted line form is a contact face 12 which is formed on the outer joint member 1, the contact face 12 being that part of the outer joint member 1 where the cage member is guided. The contact face 12 is formed to consist of a thin wear-resistant layer. The contact face 12 is subject to increased friction as the cage in this area undergoes surface contact so that the surface pressure is low but the friction is high.

Figure 3:
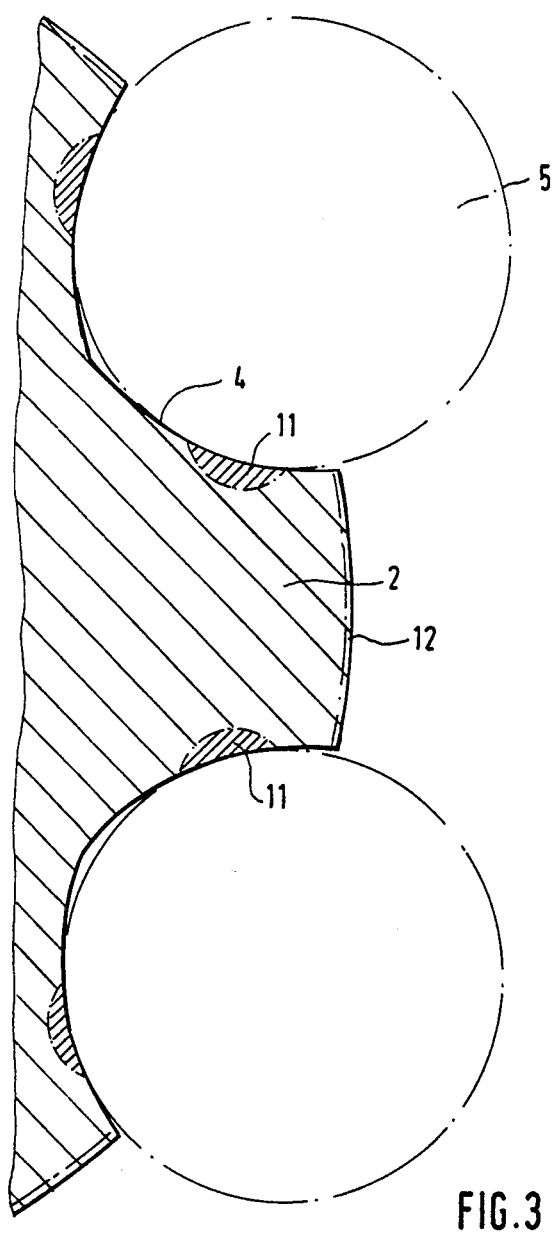
FIG. 3 is a cross-sectional view of the inner joint member showing the corresponding ball tracks.

Shown in FIG. 3 is the inner joint member 2 having ball tracks 4 which serve to receive therein the balls 5. Again, as in the case of the outer joint member 1, the inner joint member 2 is formed with contact areas 11 which are hardened to a great depth because the ball is supported in a point-like contact at these points and along these areas and the surface pressure in these areas is relatively high.

Again, as in the case of the outer joint member, the inner joint member is formed with a contact face 12 which is shown in chain-dotted line form and which is the inner face of the inner joint member 2 upon which the cage member 6 is guided. The contact face 12 also has a lower surface pressure than the contact faces 11, but increased friction occurs because of the manner in which the cage is guided.

Figure 4:
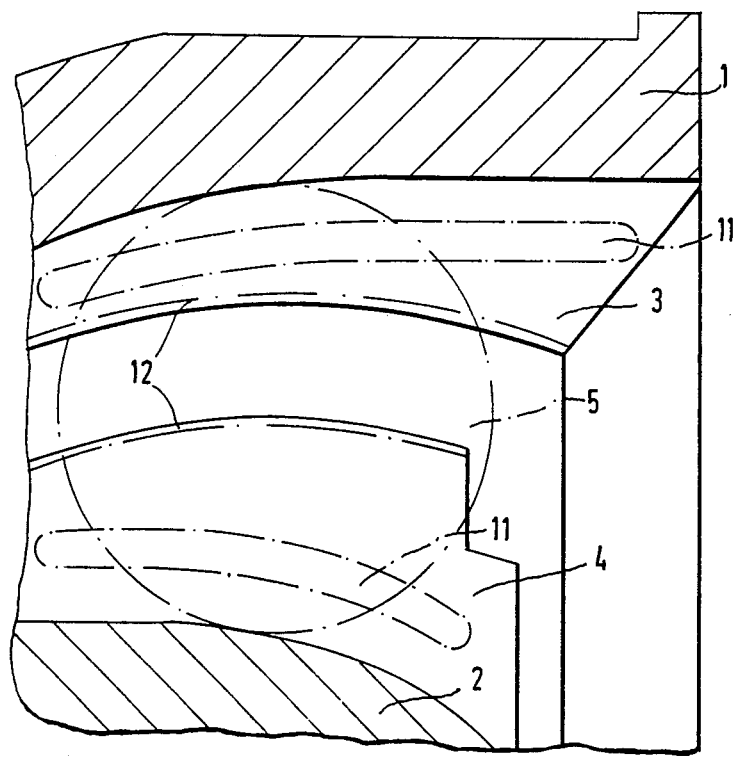
FIG. 4 is a sectional view illustrating the hardened zones formed in accordance with the invention.

FIG. 4 shows in a more simplified form the joint which is illustrated in FIG. 1. As seen in FIG. 4, the outer joint member 1 is formed with the ball tracks 3 and the contact face 11 formed in the tracks 3 is shown in its longitudinal extension. It will be seen that the hardened area 11 in the outer joint member 1 extends across the entire axial length of the ball track 3.

It will also be noted that in FIG. 4, the ball 5 is shown in schematic illustration.

On the inner joint member 2, the ball tracks 4 are also formed with contact faces 11 which are again arranged so as to extend across the entire axial length thereof. The contact faces 12 of the inner joint member 2 and the outer joint member 1 upon which the cage is guided are shown in chain-dotted form in FIG. 4, and in the case of FIG. 4, the cage itself is not shown.

Figure 5:
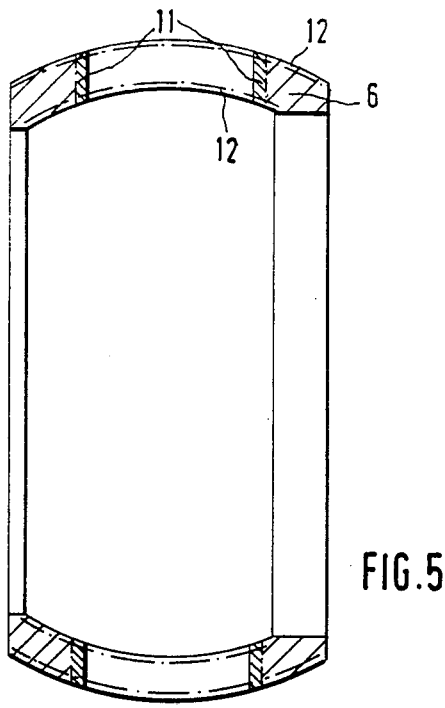
FIG. 5 is a cross-sectional view showing the cage of the universal joint as an individual component.

In FIG. 5, the cage 6 is shown in longitudinal section as an individual component in the case of which the contact face 11 again has been provided with a great depth of hardness. Additionally, the thin wear-resistant contact faces 12 are shown formed on both the inner face and the outer face of the cage 6.

Figure 6:
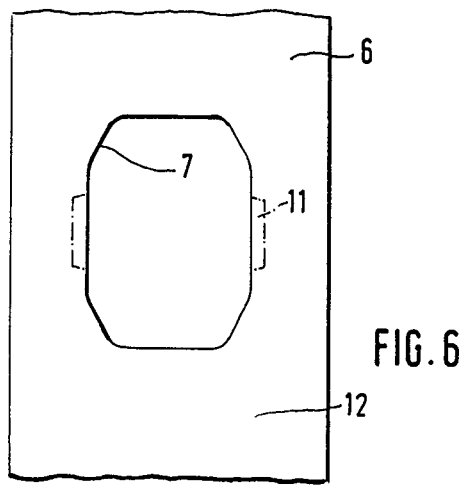
FIG. 6 is a side view of the cage shown in FIG. 5.

FIG. 6 shows a development view of part of the cage 6 with the windows 7 having been formed with contact faces 11 hardened to a great depth such as is shown in longitudinal section in FIG. 5. The outer face of the cage 6 has been designed as the contact face 12. Thus, it will be seen that the windows of the cage 6 and the areas thereof within which the balls are held are also formed with the wear-resistant contact faces 12.

It will be noted that the process of the present invention is particularly advantageous if applied to joints wherein the ball tracks are free from undercuts since the shaped inductor which is used to form the hardened surfaces may be introduced axially into the outer part or inner part of the joint. Partial hardening reduces costs and energy output and requires very little in the way of subsequent treatment.

It is a further feature of the invention that in order to produce a thin wear-resistant layer, provision will be made for a coating, surface layer hardening, or a thermo-chemical surface treatment.

Utilizing such a thin-layer process ensures a longer service life since in those workpieces, wear due to increased friction is reduced. The parts may be made either from a single material or from composite materials depending upon requirements. The coating process, for example, may be an adhesion chrome plating or nickel plating, or a plastic or nonmetal coating may be applied. Nonmetallic compositions are either organic, e.g., plastic, or inorganic coatings, e.g., silicon carbide.

The surface layer hardening process may be induction hardening, flame hardening, impulse hardening, electron beam hardening, or laser hardening. Thermochemical surface treatments are treatments with boron, chromating, nitriding, or even carburizing. The advantage of thermochemical diffusion treatments is that the entire component becomes wear-resistant including any teeth and other parts incorporated into the workpiece.

To ensure that only those areas are treated where, for functional reasons, treatment is required, a further feature of the invention involves making provision for the thin, wear-resistant layer to be applied only partially on the parts of the contact faces receiving the load, e.g., by laser beam hardening, electron beam hardening, spraying, or in the form of plastic coating or inorganic coating.

Additionally, provision is made for the hardening depth of the faces hardened to a great depth to be at least three times greater than that of the remaining contact faces between the respective joint parts.

Thus, it will be seen that the present invention operates to provide a hardening process for thin-walled joint parts.

In accordance with the invention, by means of a shaped inductor, the contact faces 11 between the balls 5 and the ball tracks 3 and between the balls 5 and the cage 6 are hardened to a great depth relative to the wall thickness of the workpiece. Furthermore, contact faces 12 between the cage and the inner joint member and the outer joint member, respectively, are provided with a wear-resistant layer 12 which is thin relative to the wall thickness of the workpiece.

While specific embodiments of the invention have been shown and described in detail to illustrate the application of the inventive principles, it will be understood that the invention may be embodied otherwise without departing from such principles.

What is claimed is:

1. A method for manufacturing a universal joint which includes an inner joint member, an outer joint member, a cage member and torque-transmitting balls supported in windows formed in said cage member and received in ball tracks formed respectively in the outer face of said inner joint member and in the inner face of said outer joint member, said balls running axially along said ball tracks in said joint members and radially across said windows in said cage member in contact therewith along ball contacting surfaces formed in said ball tracks and said windows, said cage member and said joint members further having spherical contact surfaces which are in contact with each other between said cage member and, respectively, said inner joint member and said outer joint member, said method comprising the steps of:

inductively hardening by utilization of a shape inductor said ball contacting surfaces in said inner and outer joint members and in said windows of said cage member to a specific depth which is substantial taken relative to the thickness of the component in which said hardened ball contacting surface is formed, and providing on each of said spherical contact surfaces of said cage member a wear resistant surface layer having a thickness which is relatively thin taken with relation to the wall thickness of said cage;

said specified depth of hardness of said ball contacting surfaces being at least three times the thickness of said wear resistant layer;

said ball contacting surfaces being hardened at two longitudinally extending surfaces of limited width symmetrically arranged in each of said ball tracks of said inner and said outer joint members and at two radially extending surfaces of limited width axially opposite each other in each of said windows.

2. The method according to claim 1 wherein said wear resistant layer is applied by means of a coating to said ball contact surfaces.

3. The method according to claim 2 wherein said coating is applied by one of a metal spraying process, a plating process, coating with a plastics material, and coating with an inorganic material.

4. A method according to claim 1 wherein said wear resistant layer comprises a hardened layer.

5. A method according to claim 1 wherein said wear resistant layer is applied by a thermochemical surface treatment.

6. A method according to claim 1 wherein said wear resistant layer is produced by a hardening procedure for limited hardness depth.

7. In a universal joint assembly including an inner joint member, an outer joint member, a cage member torque-transmitting balls supported in windows formed in said cage member, ball tracks formed in the outer face of said inner joint member and in the inner face of said outer joint member, said balls running axially along said ball tracks and radially across said windows in said cage member in contact with ball contacting surfaces formed in said ball tracks and said windows, said cage member and said joint members having spherical contact surfaces which are in contact with each other between said said cage member and, respectively, said inner joint member and said outer joint member, the improvement comprising:

that said ball contacting surfaces in said inner and outer joint members and in said cage member are inductively hardened to a specified depth which is substantial taken relative to the thickness of the component in which said hardened ball contacting surface is formed; and that said contact surfaces of said cage member have thereon a wear resistant surface layer having a thickness which is relatively thin taken relative to the wall thickness of said cage member;

said hardened ball contacting surfaces being hardened to a depth which is at least three times the thickness of said wear resistant layer;

said ball contacting surfaces being hardened at two longitudinally extending surfaces of limited width symmetrically arranged in each of said ball tracks of said inner and said outer joint members and at two radially extending surfaces of limited width axially opposite each other in each of said windows.

* * * * *